United States Patent [19]

Pan et al.

[11] Patent Number: 5,196,294
[45] Date of Patent: Mar. 23, 1993

[54] ERASABLE OPTICAL RECORDING MATERIALS AND METHODS BASED ON TELLURIUM ALLOYS

[75] Inventors: Kee C. Pan, Pittsford; Yuan S. Tyan, Webster; Fridrich Vazan, Pittsford, all of N.Y.

[73] Assignee: Eastman Kodak Company, Rochester, N.Y.

[21] Appl. No.: 583,105

[22] Filed: Sep. 17, 1990

[51] Int. Cl.$^5$ .................... G03C 1/72; G11B 7/24
[52] U.S. Cl. .................... 430/270; 430/19; 430/495; 430/945; 346/135.1
[58] Field of Search ............... 430/270, 495, 945, 346, 430/19; 346/135.1

[56] References Cited

U.S. PATENT DOCUMENTS

| | | | |
|---|---|---|---|
| 4,637,976 | 1/1987 | Terao et al. | 430/523 |
| 4,670,345 | 6/1987 | Morimoto et al. | 428/411.1 |
| 4,787,077 | 11/1988 | Barton et al. | 430/945 |
| 4,818,666 | 4/1989 | Gravesteijn et al. | 430/495 |
| 5,011,723 | 4/1991 | Harigaya et al. | 430/945 |

FOREIGN PATENT DOCUMENTS 60-177446 9/1985 Japan.
1-07844 2/1989 Japan.

OTHER PUBLICATIONS

Yagi et al., "Crystallization of Amorphous Marks in SbTe Erasable Optical Storage Media", *Japanese Journal of Applied Physics*, vol. 26, #26-4, p. 51 (1987).

*Primary Examiner*—Lee C. Wright
*Attorney, Agent, or Firm*—J. Jeffrey Hawley

[57] ABSTRACT

An optical recording element comprising a thin film of an alloy is disclosed. The alloy is represented by the formula $$Te_a(Sb_xSn_yIn_z)_{1-a}$$

wherein a is between about 0.38 and 0.62; x is between about 0.05 and 0.65; y divided by z is between about 0.5 and 5; with the proviso that the product of (y+z) and (1−a) is greater than about 0.20. The alloys have improved data stability while retaining excellent write-erase characteristics.

3 Claims, 1 Drawing Sheet

ERASABLE OPTICAL RECORDING MATERIALS AND METHODS BASED ON TELLURIUM ALLOYS

FIELD OF THE INVENTION

This invention relates to tellurium containing alloys that are useful in optical recording elements.

DESCRIPTION RELATIVE TO THE PRIOR ART

Optical recording, a technique utilizing a focused laser beam to make micron size marks in an appropriate medium for high density information recording, has been extensively studied in recent years. There are basically two types of optical recording; write-once and the erasable. In write-once recording, the media can only be recorded once, but the recorded information can be read many times. In erasable recording, the recorded information can be erased and new information can be recorded over the same area of the media.

The technique most widely studied for erasable recording has been based on magneto-optic materials. This technique relies on the thermal-magnetic recording process. A focused laser beam is used to heat a spot on a magneto-optical material so that its coercivity is reduced and the magnetization within the spot can be switched by an applied field. The readout is accomplished by sensing the Kerr rotation of a reading laser beam induced by the magnetization in the media. Good recording performance has been reported by many working in the field. However, all reports are based on rare-earth/transition metal alloys, notably TbFeCo, and these alloys have some fundamental problems.

An alternative technique for erasable recording uses amorphous-crystalline phase-change materials. In this technique, a focused laser beam is used to switch the material between the amorphous state and the crystalline state. As is commonly done, a high power laser is used to heat a spot on the material to above its melting point to randomize the atomic arrangement in the material. When the laser beam is switched off, the material is left in the metastable amorphous state because of the high cooling rate. A low power laser, in many cases of longer duration, is then used to heat the material to below the melting point. The increased mobility of the atoms at the elevated temperature then allows the material to go to the more stable crystalline state. Thus by varying the power and duration of the laser beam, the material can be switched between the amorphous state and the crystalline state, and erasable recording is thus accomplished.

The major problem in the development of this technique has been the lack of appropriate materials. In particular, it has been difficult to find materials which have crystallization rate high enough under laser heating to allow high rate recording, and yet slow enough at room temperature to ensure data integrity.

EP-A1-0-212-336 describes a method of erasable recording using single-phase phase-change alloys. Whereas the crystallization rate of the preferred material, a germanium telluride, appeared to be high, the laser power required for write and erase was also high. While there was no mention of the corrosion resistance of the material, it contains a very high concentration of corrosion prone tellurium.

Shogo Yagi, et al (Crystallization of Amorphous Marks in SbTe Erasable Optical Storage Media, Japanese Journal of Applied Physics, Vol 26, Supplement 26-4, 51(1987)), studied antimony-tellurium alloys for erasable optical storage. The composition range they reported were from Sb=0.19 to 0.55. They found that a $Sb_2Te_3$ thin film was the best composition due to its long amorphous life time at room temperature and short erasure time.

In copending, commonly assigned U.S. Ser. No. 435,229, filed 13 Nov. 1989, entitled ERASABLE PHASE CHANGE OPTICAL RECORDING, by Pan, Tyan and Vazan, there is disclosed an improvement in the optical recording materials of Yagi. A third element, which can be Cu, Ag, In or Ge, is added to the antimony tellurium alloy. These compositions provide easy initialization using thermal or flash lamp exposure compared to the alloys of Yagi. (Reference is also made to Morimoto, U.S. Pat. No. 4,670,345; JP60-177446; Gravesteign et al, U.S. Pat. No. 4,818,666; Terao et al, U.S. Pat. No. 4,637,976; and NTT JP63-1078444 for related compositions.)

While the optical recording elements of this commonly assigned application represent an improvement over the art, still further improvements were sought. The antimony tellurium alloys with a third element selected from Cu, Ag, In or Ge do not have all of the desirable characteristics in one alloy. Thus, for example, the Ge containing alloys have the best data stability while the In alloys have the best write-erase contrast. These are the preferred alloys of that invention. It would be most desirable to provide an alloy that combined all of the desirable characteristics of the antimony tellurium alloys while at the same time, provided a combination of good data stability and good write-erase

SUMMARY OF THE INVENTION

In accordance with the present invention, there is provided an optical recording element comprising a thin film optical recording layer of an alloy, said alloy represented by the formula

$$Te_a(Sb_xSn_yIn_z)_{1-a}$$

wherein a is between about 0.38 and 0.62; x is between about 0.05 and 0.65; y divided by z (referred to herein as y/z) is between about 0.5 and 5; with the proviso that the product of (y+z) and (1−a) (referred to herein as (y+z)(1−a)) is greater than about 0.20.

DETAILED DESCRIPTION OF THE INVENTION

Figure 1:
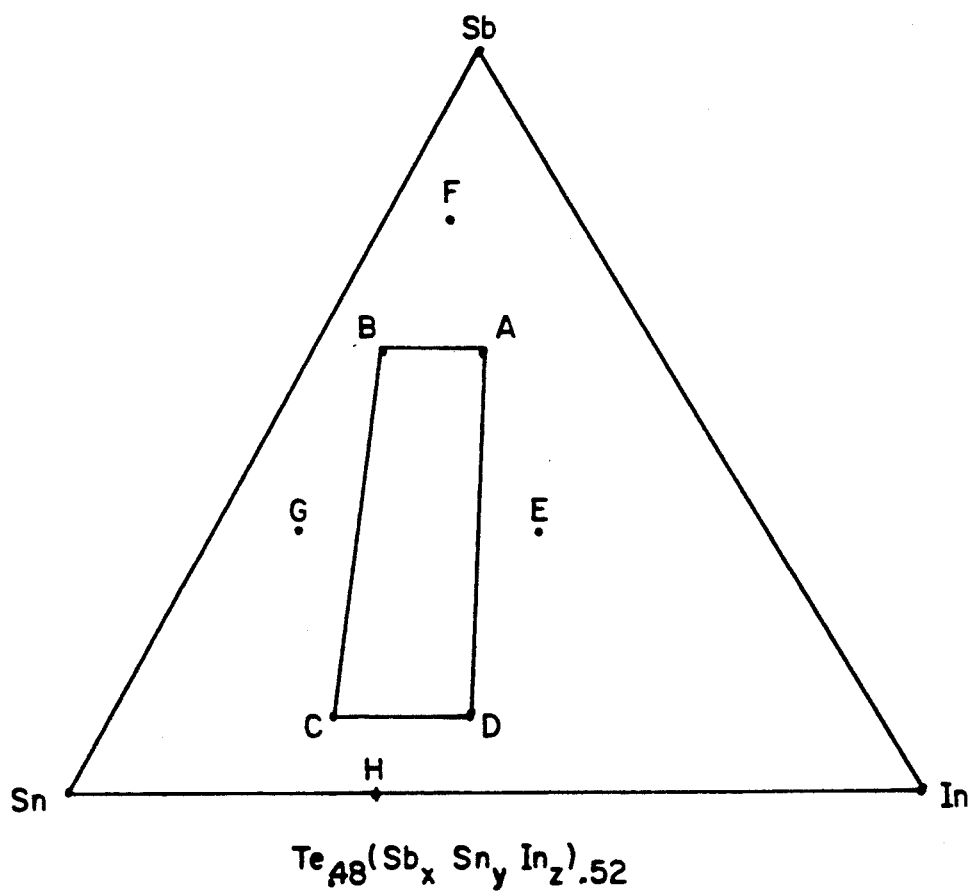
FIG. 1 is a ternary diagram showing compositions within the scope of the invention, indicated by coordinates ABCD, and compositions included for comparative purposes, point E, F, G, and H.

As noted above, the alloys useful in the present invention have four elements. The ranges of the various parameters that define the alloys are given below:

|  | Range | Preferred | Most Preferred |
| --- | --- | --- | --- |
| a | .38–.62 | .40–.60 | .45–.55 |
| x | .05–.65 | .10–.60 | .20–.50 |
| y/z | .5–5 | 1–4 | 1–3 |
| (y + z) (1 − a) | >.20 | >.25 |  |

The alloys useful in the invention have fast write-erase rates, improved sensitivity, thermal stability, and corrosion resistance. In addition, they have good data stability and good write-erase contrast.

The thin film alloy coatings of the optical recording element can be prepared by conventional vacuum deposition processes, such as evaporation and sputtering, onto a variety of substrates. The layer thickness is preferably between 3 and 300 nm. An overcoat layer is preferably applied over the alloy layer to reduce any alloy deformation as a result of the recording processes. Such deformation can result in residual signals that can not be erased by the erasing process. Common overcoat materials are polymer coatings such as those described in U.S. Pat. No. 4,340,655 issued Jul. 20, 1982 to Hollister et al and dielectric coatings such as silicon carbide, silicon nitride, aluminum nitride, silicon oxides, zinc sulfide and aluminium oxide. A commercially available acrylic spray paint such as clear Krylon ® can be used.

After the alloy is deposited, the recording layer is preferably initialized. The layer that is deposited by vacuum deposition is amorphous. For optimum performance, it is desirable to crystallize at least those portions of the layer that are to be used for recording. The layer can be crystallized by heating, for example in an oven or by other conventional means such as with a laser or a high power flash lamp.

Optical recording layers can be prepared by conventional thin film deposition techniques such as RF (radio frequency) and DC (direct current) sputtering from an alloy target using the alloys of the invention. Enhancement of sputtering processes by applying magnetic fields (magnetron sputtering) can also be used.

Supports which can be used include plastic plates, such as polyethylene terephthalate, polymethyl methacrylate, and polycarbonate, a glass plate, paper and metallic plates such as aluminum.

Erasable recording is achieved by varying the power of the laser pulses. A high power, (e.g., 100 ns, 18 mW), pulse changes the material to a low reflectivity amorphous state and a low power, (e.g., 100 ns, 6 mW), pulse changes the material to a high reflectivity crystalline state.

Thus, according to another aspect of the invention, there is provided a method of recording and erasing information on an optical recording element, said element comprising a thin film optical recording layer of an alloy in a crystalline form, said alloy having the formula

$$Te_a(Sb_xSn_yIn_z)_{1-a}$$

wherein a is between about 0.38 and 0.62; x is between about 0.05 and 0.65; y divided by z is between about 0.5 and 5; with the proviso that the product of (y+z) and (1−a) is greater than about 0.20, said method comprising the teps of:

a) recording said information by focusing an information modulated laser beam on said crystalline alloy recording layer at a power and for a time sufficient to form a pattern of amorphous areas in said layer of alloy, said pattern corresponding to said information, and b) focusing a laser beam on said recorded layer for a time and at a power sufficient to crystallize at least a portion of the amorphous areas formed in step a), thereby erasing the information in the amorphous areas.

A simple recording package comprises, starting from the outside surface of the recording material, an overcoat layer, a thin film optical recording layer as described and a substrate. In response to a drive signal, the intensity of a diode recording beam focused on the recording layer is modulated in accordance with information to be recorded.

During recording, the recording material is spun at a constant rate, e.g., 1800 rotations per minute (RPM). As a result, a track of information is recorded on the optical recording layer in the form of selected amorphized areas. As recording continues, the recording spot is caused to scan radially inward across the recording material, thereby causing information to be recorded along a spiral or concentric track. The sizes and spacings of the recorded information marks vary in accordance with the information content of the recording laser drive signal, as well as with radial position on the recording material.

During the readback process, the thus recorded information bearing recording material is spun at the same rate as it was spun during the recording process. The optical path of a readout laser beam is focused to a playback spot on the recording material by a high numerical aperture lens. The recording material is of the reflective type so that the radiation forming the playback spot is reflected back through the high numerical aperture lens after interacting with the information marks recorded on the optical recording material. A lens directs reflected laser radiation onto a detector which produces an electrical playback signal in response to temporal variations (contrast) in the irradiance of the reflected laser radiation falling on the detector.

Other types of recording packages aer also useful. For example, a reflective substrate such as aluminum can be provided with a recording layer comprising an alloy of the invention on both sides of the substrate. A useful recording package is thus, aluminum coated on both sides with a smoothing layer, a layer of the phase change alloy of the invention and a layer of a clear protective overcoat. In a similar embodiment, the alloy is provided on a clear substrate which is then adhered to both sides of the substrate with an adhesive. In yet another embodiment, the alloy as described in provided on a transparent substrate to form the recording layer. The optical recording layer is then adhered to the recording layer of an identical recording material with an adhesive layer. The thickness of the adhesive layer provides for the optical separation of the two recording layers.

The following examples are presented for a further understanding of the invention.

EXAMPLE 1

Te-Sb-Sn-In thin films on glass substrates were prepared by sputtering and the thickness was about 700 Angstroms. The films were then overcoated with a polymeric layer for write-ease evaluation.

As can be seen from Table 1 below, this quaternary system was studied over a wide composition range. It was found that, where the Te concentration was low, e.g. a between 0.28 and 0.37, the compositions had excellent write erase characteristics but the data stability was less than desired. However, where a was between about 0.38 and 0.62, and (y+z)(1−a)>0.20, the compositions exhibited both good write-erase characteristics and good data stability. As to good write-erase characteristics, samples 1 to 25 (i.e. those within the scope of the invention and a few comparative samples) could be cycled by laser pulses with a band width between 40 and 200 ns. The write power was 18 mW and the erase power was between 6 and 10 mW. Samples 1 through 14, i.e. those within the scope of the invention, also exhibited excellent data stability.

TABLE 1

Stability of Melt Quenched Amorphous Marks

| # | a | x | y | z | (y + z)(1 − a) | Stability |
|---|---|---|---|---|---|---|
| 1 | .48 | .44 | .38 | .18 | .29 | >>35 days @ 90° C. |
| 2 | .45 | .42 | .41 | .17 | .32 | " |
| 3 | .50 | .40 | .40 | .20 | .30 | >>12 days @ 90° C. |
| 4 | .51 | .31 | .45 | .24 | .34 | " |
| 5 | .54 | .25 | .46 | .29 | .35 | " |
| 6 | .54 | .20 | .48 | .32 | .37 | " |
| 7 | .55 | .16 | .49 | .35 | .38 | " |
| 8 | .41 | .38 | .41 | .21 | .37 | " |
| 9 | .46 | .32 | .39 | .29 | .37 | " |
| 10 | .49 | .23 | .41 | .36 | .39 | " |
| 11 | .51 | .18 | .42 | .40 | .40 | " |
| 12 | .54 | .12 | .44 | .44 | .40 | " |
| 13 | .43 | .54 | .32 | .14 | .26 | " |
| 14 | .48 | .46 | .35 | .19 | .28 | " |
| 15 | .32 | .90 | .00 | .10 | .07 | <15 days @ 80° C. |
| 16 | .36 | .87 | .00 | .13 | .08 | " |
| 17 | .33 | .85 | .00 | .15 | .10 | " |
| 18 | .35 | .77 | .00 | .23 | .15 | " |
| 19 | .34 | .94 | .06 | .00 | .04 | <10 days @ 70° C. |
| 20 | .31 | .88 | .12 | .00 | .08 | " |
| 21 | .37 | .84 | .16 | .00 | .10 | " |
| 22 | .35 | .76 | .17 | .07 | .16 | <6 days @ 80° C. |
| 23 | .37 | .55 | .32 | .13 | .28 | <<2 days @ 90° C. |
| 24 | .36 | .68 | .23 | .09 | .20 | " |
| 25 | .34 | .74 | .18 | .08 | .17 | " |
| 26 | .28 | .76 | .24 | .00 | .17 | crystalline film |
| 27 | .51 | .76 | .19 | .05 | .12 | " |
| 28 | .53 | .77 | .15 | .08 | .11 | " |
| 29 | .45 | .65 | .18 | .02 | .11 | " |

EXAMPLE 2

A number of alloy optical recording layers were prepared in a manner similar to that of Example 1. In these compositions, the amount of Te was held at $a=0.48$. The variation in antimony, indium and tin is shown n the ternary diagram, FIG. 1. Useful compositions within the formula

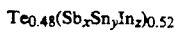

$Te_{0.48}(Sb_xSn_yIn_z)_{0.52}$ are illustrated by the tetragon ABCD. Compositions within this range have excellent write-erase characteristics and good data stability.

Compositions outside this range were also prepared and tested. We found that increased indium (point E) increased the erasure time to unacceptable levels (>10 μs). Increased antimony (point F) reduced film stability to the extent that the point F film was crystalline as deposited. Increased tin (point G) produced a very high crystallization rate and, as a result, melt quenching did not lead to amorphous marks. Finally, decreased antimony (point E) led to decreased write-erase contrast.

The coordinates of the indicated points in FIG. 1 are indicated in Table 2.

TABLE 2

Coordinates of Points in FIG. 1
$Te_{0.48}(Sb_xSn_yIn_z)_{0.52}$

| Point | x | y | z |
|---|---|---|---|
| A | .60 | .20 | .20 |
| B | .60 | .32 | .08 |
| C | .10 | .64 | .26 |
| D | .10 | .48 | .42 |
| E | .36 | .26 | .38 |
| F | .76 | .16 | .08 |
| G | .36 | .54 | .10 |
| H | .00 | .64 | .36 |

We also concluded that the useful composition range for Sb, Sn and In was greatest when the tellurium content was 50% (a=0.50).

EXAMPLE 3

The crystal structure of thin film samples was determined by x-ray diffraction. Sample compositions are shown in Table 3. The thin film samples were crystallized by heating them at 250° C. for 2 minutes.

TABLE 3

X-ray Diffraction Samples
$Te_a(Sb_xSn_yIn_z)_{1-a}$

| a | x | y | z |
|---|---|---|---|
| 0.50 | 0.40 | 0.40 | 0.20 |
| 0.51 | 0.31 | 0.45 | 0.24 |
| 0.50 | 0.27 | 0.50 | 0.23 |
| 0.54 | 0.25 | 0.46 | 0.29 |
| 0.51 | 0.14 | 0.53 | 0.33 |
| 0.55 | 0.16 | 0.49 | 0.35 |

All of the samples showed the same x-ray diffraction pattern. It is concluded that the samples had the same crystalline phase, a NaCl type structure which is an iso-structure with Sn(II)Te. The lattice constant for the samples was found to be about 0.627 nm.

The present invention has been described with reference to particularly preferred embodiments thereof. However, it will be understood that modifications and extensions can be effected within the spirit and scope of the invention.

What is claimed is:

1. An optical recording element comprising a thin film optical recording layer of an alloy, said alloy represented by the formula $Te_a(Sb_xSn_yIn_z)_{1-a}$ wherein a is between about 0.38 and 0.62; x is between about 0.05 and 0.65; y divided by z is between about 0.5 and 5; with the proviso that the product of (y+z) and (1−a) is greater than 0.20.

2. The optical recording element according to claim 1 wherein a is between about 0.40 and 0.60; x is between about 0.10 and 0.60; y/z is between about 1 and 4 and (y+z)(1−a) is greater than about 0.25.

3. The optical recording element according to claim 1 wherein a is about 0.5.

* * * * *